(12) United States Patent
Kamata et al.

(10) Patent No.: US 9,189,103 B2
(45) Date of Patent: Nov. 17, 2015

(54) TERMINAL DEVICE AND KEY ENTRY METHOD FOR PREVENTING ERRONEOUS ENTRY IN KEY ENTRY

(71) Applicant: FUJITSU LIMITED, Kawasaki-shi, Kanagawa (JP)

(72) Inventors: Kyoko Kamata, Kawasaki (JP); Katsuaki Akama, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/177,365

(22) Filed: Feb. 11, 2014

(65) Prior Publication Data

US 2014/0292727 A1 Oct. 2, 2014

(30) Foreign Application Priority Data

Mar. 28, 2013 (JP) ................... 2013-070692

(51) Int. Cl.
  *G06F 3/041* (2006.01)
  *G06F 3/023* (2006.01)
  *G06F 3/0488* (2013.01)

(52) U.S. Cl.
  CPC ............ *G06F 3/0418* (2013.01); *G06F 3/0233* (2013.01); *G06F 3/04886* (2013.01)

(58) Field of Classification Search
  CPC ........... G06F 3/00; G06F 3/041; G06F 3/045; G06F 3/042; G06F 3/048; G09G 5/00; G06K 11/06; G08C 21/00

USPC .................................. 345/173–175; 715/702
See application file for complete search history.

(56) References Cited

U.S. PATENT DOCUMENTS

| | | | |
|---|---|---|---|
| 8,665,233 B2* | 3/2014 | Moon et al. .................... | 345/173 |
| 2005/0030291 A1* | 2/2005 | Yanagisawa ................... | 345/173 |
| 2010/0235732 A1* | 9/2010 | Bergman ....................... | 715/702 |
| 2010/0328238 A1 | 12/2010 | Sugiue | |
| 2012/0019459 A1 | 1/2012 | Moon et al. | |
| 2013/0027336 A1 | 1/2013 | Liu | |

FOREIGN PATENT DOCUMENTS

| | | |
|---|---|---|
| JP | 2011-13730 | 1/2011 |
| WO | 03027826 | 4/2003 |

OTHER PUBLICATIONS

EESR—Extended European Search Report issued for European Patent Application No. 14153226.7 mailed on May 19, 2015.

* cited by examiner

*Primary Examiner* — Pegeman Karimi
(74) *Attorney, Agent, or Firm* — Fujitsu Patent Center

(57) ABSTRACT

The terminal device includes a touch panel that accepts a touch entry including a first touch on a first key corresponding to a first position and a second touch on a second key corresponding to a second position that is different from the first position, and a processor that detects the first touch and the second touch, determines elapsed time from the first touch to the second touch when detecting the second touch after detecting the first touch, and decides that the second touch is a touch to the first key when the elapsed time is less than a threshold.

5 Claims, 7 Drawing Sheets

| KEY TYPE | COORDINATE (X1, Y1) - (X2, Y2) |
|---|---|
| ABC | (200, 300) - (280, 365) |
| DEF | (290, 300) - (370, 365) |
| GHI | (380, 300) - (460, 365) |
| JKL | (200, 225) - (280, 290) |
| MNO | (290, 225) - (370, 290) |
| PQRS | (380, 225) - (460, 290) |
| TUV | (200, 150) - (280, 215) |
| WXYZ | (290, 150) - (370, 215) |
| @#& | (380, 150) - (460, 215) |

FIG.7

| NUMBER OF SUCCESSIVE TIMES / KEY TYPE | FIRST | SECOND | THIRD | FOURTH | FIFTH |
|---|---|---|---|---|---|
| ABC | A | B | C | RETURN | — |
| DEF | D | E | F | RETURN | — |
| GHI | G | H | I | RETURN | — |
| JKL | J | K | L | RETURN | — |
| MNO | M | N | O | RETURN | — |
| PQRS | P | Q | R | S | RETURN |
| TUV | T | U | V | RETURN | — |
| WXYZ | W | X | Y | Z | RETURN |
| @#& | @ | # | & | RETURN | — |

FIG.8

| UNDER-TOGGLE-CONVERSION KEY | NUMBER OF SUCCESSIVE TIMES |
|---|---|
| ABC | 2 |

| KEY TYPE | COORDINATE (X1, Y1) - (X2, Y2) |
|---|---|
| ABC | (255, 300) - (335, 365) |
| DEF | (345, 300) - (425, 365) |
| GHI | (435, 300) - (515, 365) |
| JKL | (255, 225) - (335, 290) |
| MNO | (345, 225) - (425, 290) |
| PQRS | (435, 225) - (515, 290) |
| TUV | (255, 150) - (335, 215) |
| WXYZ | (345, 150) - (425, 215) |
| @#& | (435, 150) - (515, 215) |

TERMINAL DEVICE AND KEY ENTRY METHOD FOR PREVENTING ERRONEOUS ENTRY IN KEY ENTRY

CROSS-REFERENCE TO RELATED APPLICATION

This application is based upon and claims the benefit of priority of the prior Japanese Patent Application No. 2013-070692, filed on Mar. 28, 2013, the entire contents of which are incorporated herein by reference.

FIELD

The embodiments discussed herein are related to a terminal device, a key entry method, and a key entry program.

BACKGROUND

In recent years, in mobile terminal devices (hereafter, also referred to as "mobile terminal" as an abbreviation), smart phones have been prevalent in place of the conventional mobile telephones having mechanical button keys (hereafter, also referred to as "old-type mobile phone").

In the general old-type mobile phones, text entries have been made with the use of button keys with a mechanical structure. Further, since compact mobile terminals are desirable, the mobile terminal cannot be equipped with a full keyboard. Therefore, the old-type mobile phones have a "ten-key" with a mechanical structure, and the text entries to the old-type mobile phone have been made with the use of this ten-key. As the exemplary text entry system using the ten-key, so called "toggle entry" has been known. The toggle entry is an entry system in which one key is allocated with a plurality of characters such as the characters of one row of the Japanese syllabary or three or four characters of the alphabet, and every time a key is pressed down, next character appears sequentially as a candidate for entering text. For example, in the toggle entry, every time the key with "a" written thereon is pressed down, the candidate for entering text changes in the order of "a→i→u→e→o→a→ . . . " and every time the key with "ABC" written thereon is pressed down, the candidate for entering text changes in the order of "A→B→C→ A→ . . . ".

Further, some of the ten-keys on the old-type mobile phones have the convex shapes, which are different from respective keys on its touch surfaces in order to allow a user to distinguish respective keys of the ten-key by the user's feeling in a finger without looking at the ten-key. This supports the text entry by the visually impaired users.

On the other hand, text entry to a smart phone is often made by the user touching by the user's finger to the touch panel that is laminated on the LCD (Liquid Crystal Display) provided on the surface of the smart phone. Further, the ten-key used in the text entry is displayed on the LCD as an image. The LCD displays not only the ten-key but also various images according to the usage of the smart phone. Further, the surface of the general touch panel can be a flat shape only. Therefore, it is difficult to form the convex shapes for distinguishing respective keys on the touch panel of the smart phone, unlike in the old-type mobile phone. Therefore, as a technique for supporting a visually impaired user to made the text entry to the smart phone, there is a technique of voice notification by reading aloud the touched key when any of the ten-key on the touch panel is touched. For example, in the toggle entry, a voice tells "ei" when the key with "ABC" written thereon is touched for one time, a voice tells "bi" when it is touched for two times, and a voice tells "si" when it is touched for three times. As such, the voice notification of the touched key allows the visually impaired user and the like to know the position of the desired key on the touch panel.

Related-art examples are described, for example, in Japanese Laid-open Patent Publication No. 2011-013730 and International Publication Pamphlet No. WO2003/027826.

However, when the user of the smart phone has visual impairment, it is difficult to know, by the visual observation, the desired key that the user intends to touch. Further, as mentioned above, the surface of the general touch panel can take a flat shape only. Therefore, when the user of the smart phone has visual impairment, when the user makes the text entry without looking at the key image, or the like, the key which is different from the desired key recognized by the user may be touched by the user. In particular, when the user intends to successively touch the same key for making the toggle entry, there is a case that every time the key is touched, the touched position shifts and the key different from the desired key is touched. For example, when the user who intends to enter "C" using the toggle entry touches the "ABC" key three times, there is a case that every time the key is touched, the touched position shifts, resulting in that, at a third touch, the user may touch "DEF" key neighboring on the right of the "ABC" key.

SUMMARY

According to an aspect of an embodiment, a terminal device includes a touch panel that accepts a touch entry including a first touch on a first key corresponding to a first position and a second touch on a second key corresponding to a second position that is different from the first position, and a processor that detects the first touch and the second touch, determines elapsed time from the first touch to the second touch when detecting the second touch after detecting the first touch, and decides that the second touch is a touch to the first key when the elapsed time is less than a threshold.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a view illustrating an example of a toggle character selection table of the first embodiment;

FIG. 8 is a view illustrating an example of an under-toggle-conversion table of the first embodiment;

DESCRIPTION OF EMBODIMENTS

Preferred embodiments of the present invention will be explained with reference to accompanying drawings. It is noted that the terminal device, the key entry method, and the key entry program disclosed by the present application are not limited by the embodiment. Further, in the following embodiment, the component having the same function and the step performing the same process will be denoted with the same numeral reference, and thus the duplicated description will be omitted. It is noted that, in the followings, the terminal device is also referred to as "terminal" as an abbreviation.

[a] First Embodiment

Hardware Configuration of the Terminal

Figure 1:
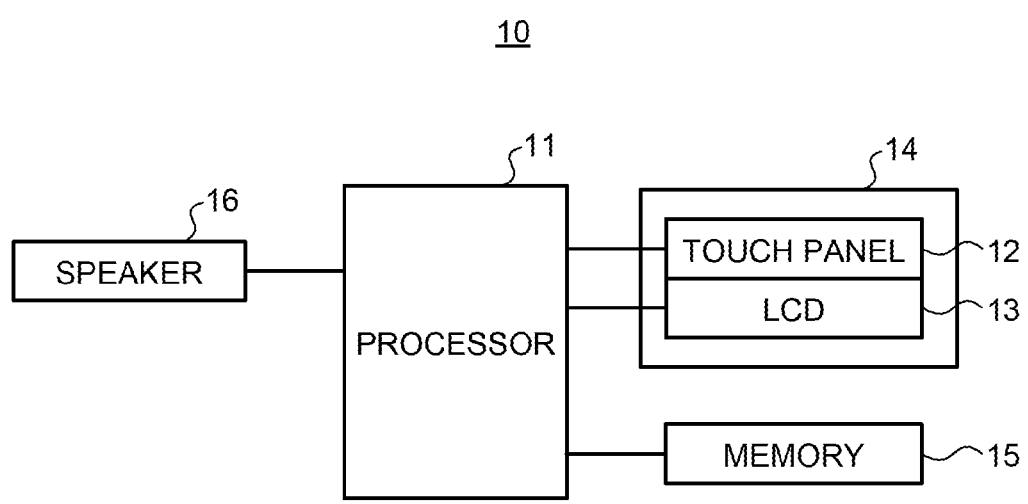
FIG. 1 is a view illustrating a hardware configuration example of a terminal device of a first embodiment.

FIG. 1 is a view illustrating a hardware configuration example of the terminal of the first embodiment. In FIG. 1, a terminal 10 has a processor 11, a touch panel 12, an LCD 13, a memory 15, and a speaker 16. The example of the terminal 10 includes a smart phone, a tablet terminal, and so on.

The processor 11 performs various processes in the terminal 10. In particular, the processor 11 controls the touch entry to the touch panel 12. An example of the processor 11 includes a CPU (Central Processing Unit), a DSP (Digital Signal Processor), an FPGA (Field Programmable Gate Array), and the like.

The touch panel 12 and the LCD 13 are laminated to configure a display module 14, and the display module 14 is attached onto the surface of the terminal 10.

The memory 15 stores various application programs, various tables, and so on. Further, the memory 15 is used as a buffer memory. An example of the memory 15 includes a RAM such as an SDRAM and the like, a ROM, a flash memory, and the like.

The speaker 16 outputs a voice, an alert, and so on.

Operation of the Terminal

Figure 2:
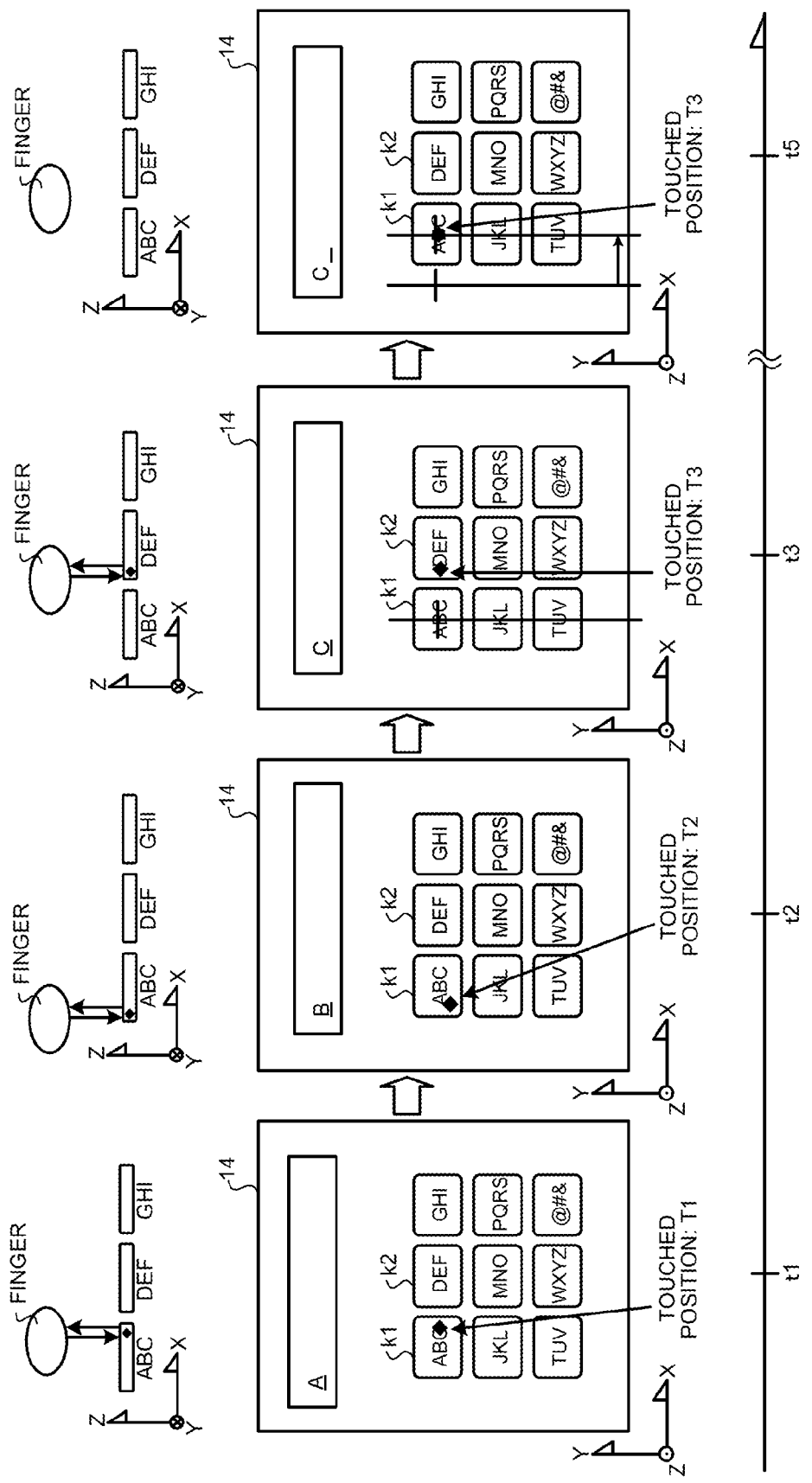
FIG. 2 is a view provided for describing the operation of the terminal device of the first embodiment.

FIG. 2 is a view provided for describing the operation of the terminal device of the first embodiment When the alphabet text entry is made to the terminal 10 by the toggle entry, the ten-key on which each of the keys is allocated with three or four alphabet characters is displayed. For example, a key k1 is allocated with A, B, and C, and a key k2 is allocated with D, E, and F. Therefore, every time the key k1 is touched, the candidate for entering text changes in the order of "A→B→C→A→ . . . ". Also, every time the key k2 is touched, the candidate for entering text changes in the order of "D→E→F→D→ . . . ". As illustrated in FIG. 2, the candidate for entering text is displayed on a predetermined area of the display module 14 with an underline. Further, as illustrated in FIG. 2, respective keys of the ten-key are displayed at the positions different from each other. The positions of these keys are the position on the two-dimensional plane common to both the touch panel 12 and the LCD 13. That is, the touch panel 12 is adapted to accept the touch entries on the key k1 corresponding to a first position and the key k2 corresponding to a second position that is different from the first position.

At time t1, it is assumed that a position T1 within the area of the key k1 is touched as the first touch on the touch panel 12 by the user's finger. The processor 11 that has detected the first touch on the key k1 causes the LCD 13 to display "A" as the candidate for entering text.

Subsequently, at time t2, it is assumed that the touched position shifts from the first touch and a position T2 is touched as the second touch. Since the touched position T2 is within the area of the key k1 similarly to the first touched position T1, the processor 11 detects the second touch on the key k1 and causes the LCD 13 to display "B" as the candidate for entering text.

Subsequently, at time t3, it is assumed that the touched position shifts from the second touch and a position T3 is touched as the third touch. Unlike the second touched position T2, the touched position T3 is within the area of the key k2. Therefore, the third touch is the first touch on the key k2. Then, the processor 11, which has detected that the key k2 different from the key k1 touched in the second time is touched in the third time, determines the elapsed time from the time t2 at which the second touch was made to the time t3 at which the third touch was made. When the elapsed time is less than a threshold, the processor 11 then decides that the touch on the key k2 at the time t3 is the touch on the key k1. That is, after detecting the touch on the key k1 and upon detecting the touch on the key k2, the processor 11 determines the elapsed time from the touch on the key k1 to the touch on the key k2. When the elapsed time is less than the threshold, the processor 11 then decides that the touch on the key k2 is the touch on the key k1. Therefore, as the candidate for entering text, the processor 11 causes the LCD 13 to display "C" corresponding to the third touch to the key k1 instead of "D" corresponding to the first touch on the key k2.

Then, it is assumed that the elapsed time from the time t3 reaches the time equal to or greater than the threshold at time t5 without any next touch made. The processor 11 then recognizes, as a decision process of the entered text, that the elapsed time from the time t3 is equal to or greater than the threshold without any touch made after the touch was made at the time t3. Therefore, the processor 11 fixes the entered character to "C" at the time t5 that is the time when the elapsed time from the time t3 reaches the time equal to or greater than the threshold, and waits for a next touch.

Further, the processor 11, which has decided that the touch on the key t2 is the touch on the key k1 at the time t3, moves the displayed position of the ten-key according to the touched position T3 that is the final touched position before the entered character is fixed. That is, at the time t5, the processor 11, which has detected the touch on the key k2 at the time t3, moves the displayed position of the ten-key so that the center position of the key k1 matches the touched position T3.

Process in the Terminal

Figure 3:
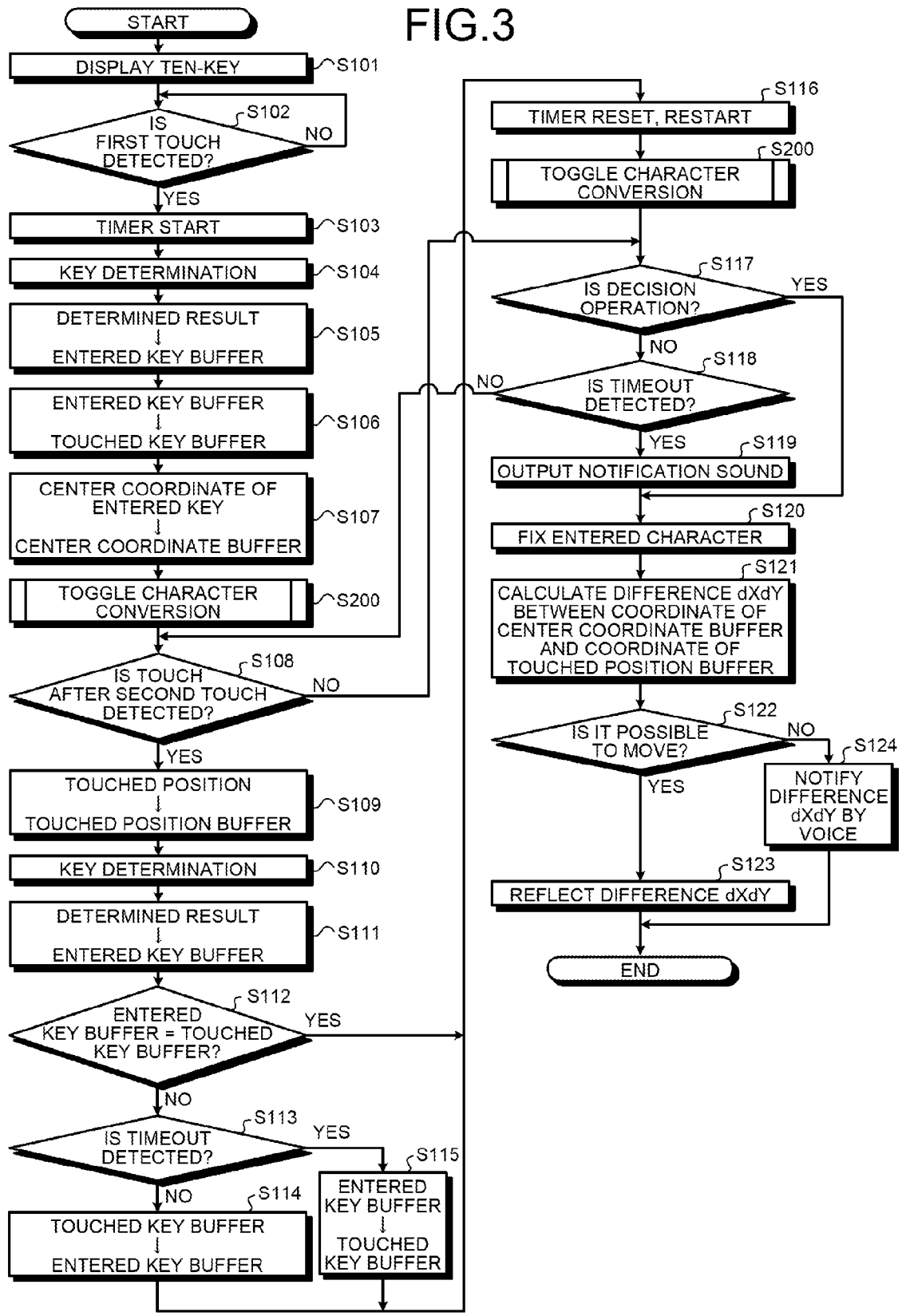
FIG. 3 is a flowchart provided for describing the process in the terminal device of the first embodiment.
Figure 4:
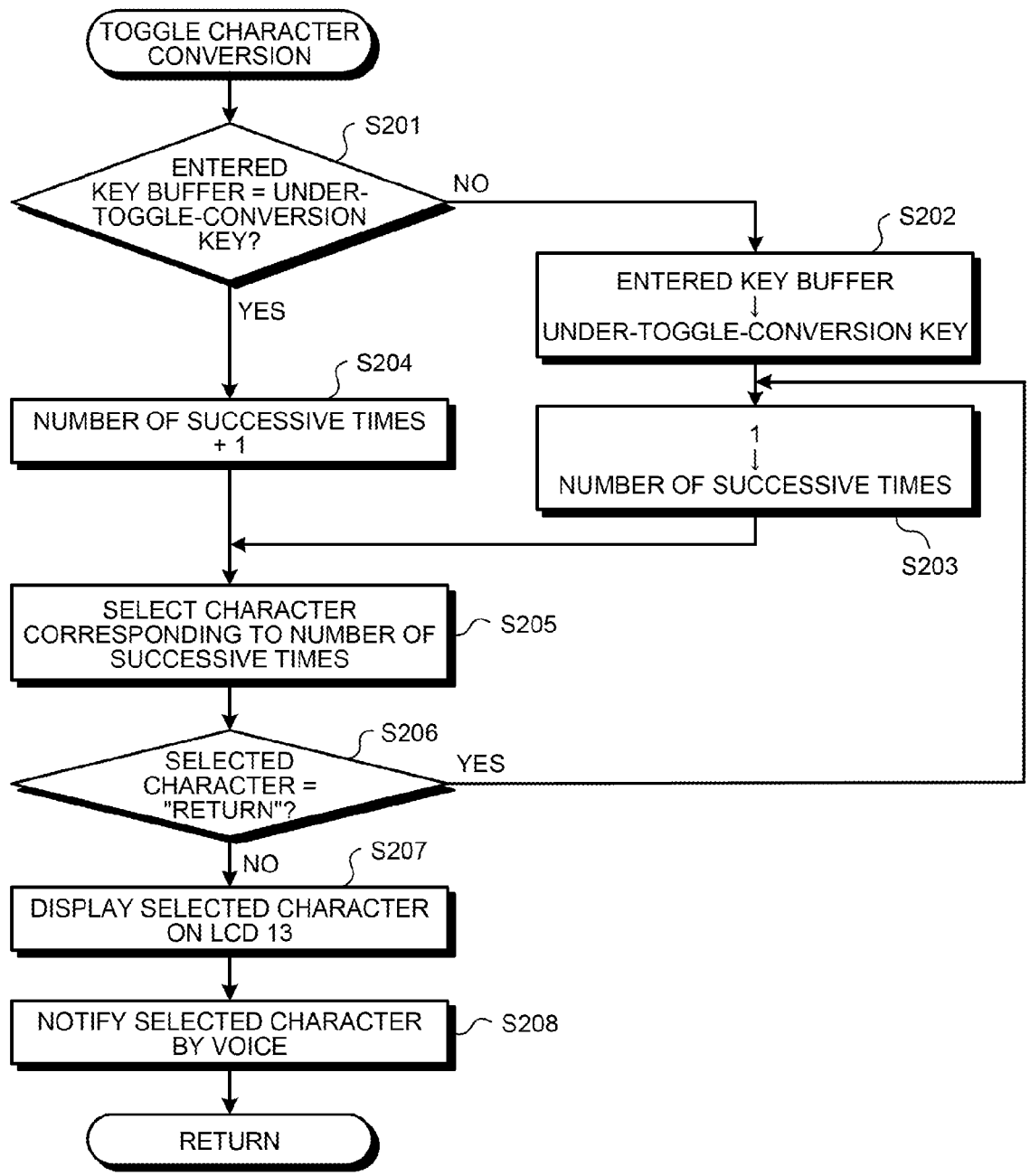
FIG. 4 is a flowchart provided for describing the process in the terminal device of the first embodiment.

FIG. 3 and FIG. 4 are flowcharts provided for the description of the process in the terminal device of the first embodiment. The processor 11 repeatedly performs the processes of steps S101 to S124.

Upon causing the LCD 13 to display the ten-key (step S101), the processor 11 monitors the operation made to the touch panel 12 and waits for the first touch that is the initial touch after the ten-key is displayed (step S102: No).

In response to the detection of the first touch on the touch panel 12 (step S102), the processor 11 causes a timer provided in the processor 11 to start (step S103). Upon starting, the timer times a predetermined time.

Subsequently, the processor 11 determines the key on which the touch is made at step S102 (step S104), saves the determined result in an "entered key buffer" of the memory 15 (step S105), and copies the content of the entered key buffer to a "touched key buffer" of the memory 15 (step S106). Further, the processor 11 derives the center coordinate of the entered key, that is, the key on which the touch is made at step S102, and saves the value of the center coordinate in a "center coordinate buffer" of the memory 15 (step S107).

Figures 5, 6:
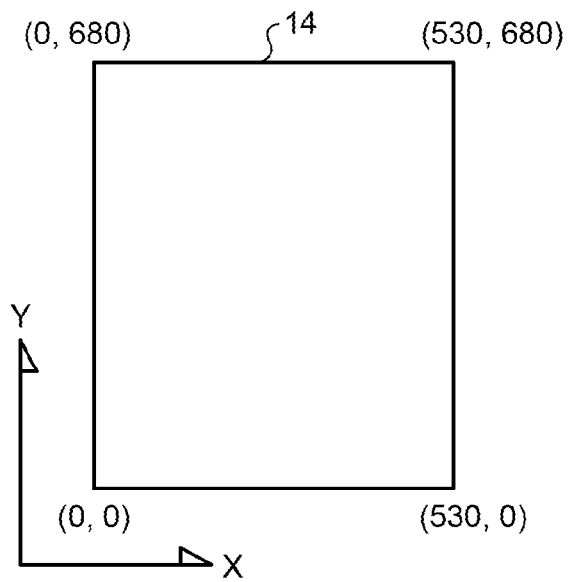
FIG. 5 is a view illustrating an example of an XY coordinate of a display module of the first embodiment.
FIG. 6 is a view illustrating an example of a key display table of the first embodiment.

Here, the relationship between each key of the ten-key with the XY coordinate will be described. FIG. 5 is a view illustrating an example of the XY coordinate of the display module of the first embodiment, and FIG. 6 is a view illustrating an example of a key display table of the first embodiment.

As illustrated in FIG. 5, using the XY coordinate and assuming that the lower left corner is defined as the origin (X1, Y1), the area size of the display module 14, that is, the touched area size of the touch panel 12 and the display area size of the LCD 13 are defined by the rectangular represented by the origin and the upper right corner coordinate (X2, Y2). Here, for example, it is assumed that the area size of the display module 14 is (X1, Y1)–(X2, Y2)=(0, 0)–(530, 680).

On the other hand, the area of each key of the ten-key on the display module 14 is defined using the XY coordinate in the key display table as illustrated in FIG. 6. For example, the area of the key k1 (FIG. 2) whose key type is "ABC" is (X1, Y1)–(X2, Y2)=(200, 300)–(280, 365), and the area of the key k2 (FIG. 2) whose key type is "DEF" is (X1, Y1)–(X2, Y2)= (290, 300)–(370, 365). When the touched position on the touch panel 12 is included in the area (200, 300)–(280, 365), the processor 11 then determines that the key corresponding to the touched position is the key k1. Further, when the touched position on the touch panel 12 is included in the area (290, 300)–(370, 365), the processor 11 determines that the key corresponding to the touched position is the key k2. In addition, the center coordinate of the key k1 whose key type is "ABC" is (240, 333) and the center coordinate of the key k2 whose key type is "DEF" is (330, 333).

Turning back to the description with FIG. 3, the processor 11 subsequently performs a toggle character conversion (step S200). The toggle character conversion will be described using FIG. 4, FIG. 7, and FIG. 8. FIG. 7 is a view illustrating an example of the toggle character selection table of the first embodiment, and FIG. 8 is a view illustrating an example of an under-toggle-conversion table of the first embodiment.

As illustrated in FIG. 7, in the toggle character selection table, defined is the association among respective keys of the ten-key, the number of successive times of the touch on respective keys, and the candidate for entering text to be selected. For example, it is defined that, when the key k1 (FIG. 2) whose key type is "ABC" is successively touched, the candidate for entering text repeatedly changes in the order of "A→B→C→A→ . . . " depending on the touched times. Also, for example, it is defined that, when the key k2 (FIG. 2) whose key type is "DEF" is successively touched, the candidate for entering text repeatedly changes in the order of "D→E→F→D→ . . . " depending on the touched times.

Further, the under-toggle-conversion table has "under-toggle-conversion key" that is the item representing the key under the toggle conversion and "the number of successive times" that is the item representing the number of successive times of the touch on the under-toggle-conversion key.

Then, as illustrated in FIG. 4, the processor 11 determines whether or not the content of the entered key buffer matches the under-toggle-conversion key of the under-toggle-conversion table (step S201).

If the content of the entered key buffer does not match the under-toggle-conversion key of the under-toggle-conversion table (step S201: No), the processor 11 copies the content of the entered key buffer to the under-toggle-conversion key of the under-toggle-conversion table (step S202). Further, the processor 11 sets the number of successive times in the under-toggle-conversion table to "1" (step S203). It is noted that, since the first touch is the initial touch after the ten-key is displayed, the under-toggle-conversion key is empty when the first touch is made. Therefore, when the first touch is made, the content of the entered key buffer does not match the under-toggle-conversion key.

On the other hand, if the content of the entered key buffer matches the under-toggle-conversion key of the under-toggle-conversion table (step S201: Yes), the processor 11 adds "1" to the number of successive times in the under-toggle-conversion table (step S204).

Subsequently, the processor 11 refers to the toggle character selection table based on the under-toggle-conversion key and the number of successive times in the under-toggle-conversion table and selects, from the toggle character selection table, a character corresponding to the under-toggle-conversion key and the number of successive times as the candidate for entering text (step S205).

Subsequently, the processor 11 determines whether or not the character selected from the toggle character selection table is "return" (step S206) and, if it is "return" (step S206: Yes), sets the number of successive times in the under-toggle-conversion table to "1" again (step S203).

On the other hand, if the character selected from the toggle character selection table is not "return" (step S206: No), the processor 11 causes the LCD 13 to display the character selected at step S205 as the candidate for entering text (step S207).

Subsequently, the processor 11 reads aloud the character selected at step S205 to voice notify the user of the character from the speaker 16 (step S208). After the voice notification, the process returns to the flowchart of FIG. 3.

Turning back to the description with FIG. 3, the processor 11 determines whether or not it detects the second or subsequent touch after the ten-key is displayed, that is, the touch made on and after the second touch (step S108).

Upon detecting the touch made on and after the second touch on the touch panel 12 (step S108: Yes), the processor 11 determines the touched position, that is, the coordinate of the touch position and saves the determined result in a "touched position buffer" of the memory 15 (step S109). Further, the processor 11 determines the key on which the touch is made at step S108 (step S110) and saves the determined result in the entered key buffer of the memory 15 (step S111).

Subsequently, the processor 11 determines whether or not the content of the entered key buffer matches the content of the touched key buffer (step S112). If the content of the entered key buffer does not match the content of the touched key buffer (step S112: No), the processor 11 determines whether or not the time expires, that is, whether or not the timeout of the timer is detected (step S113). If the content of the entered key buffer matches the content of the touched key buffer (step S112: Yes), the process proceeds to step S116.

Then, even if the content of the entered key buffer does not match the content of the touched key buffer, if the timeout of the timer is not detected (step S112: No, step S113: No), the processor 11 overwrites the content of the entered key buffer with the content of the touched key buffer (step S114).

On the other hand, if the content of the entered key buffer does not match the content of the touched key buffer and if the timeout of the timer is detected (step S112: No, step S113: Yes), the processor 11 overwrites the content of the touched key buffer with the content of the entered key buffer (step S115).

Subsequently, the processor 11 resets and restarts the timer (step S116) and performs the toggle character conversion (step S200). The toggle character conversion has been described above and thus the description will be omitted.

Subsequently, upon the completion of the toggle character conversion of step S200, or if the touch made on and after the second touch is not detected at step S108 (step S108: No), the processor 11 determines whether or not there is a "decision operation" of the entered character (step S117). If there is no decision operation (step S117: No), the process proceeds to step S118, while, if there is a decision operation (step S117: Yes), the process proceeds to step S120.

Here, the "decision operation" refers to the following first operation or second operation.

First Operation

The first operation refers to the operation by which the same key is continuously touched for a predetermined time or longer. When the time elapses for the predetermined time or longer with the same key being touched, the processor 11 determines that there is a decision operation of the entered character.

Second Operation

Figures 9, 10:
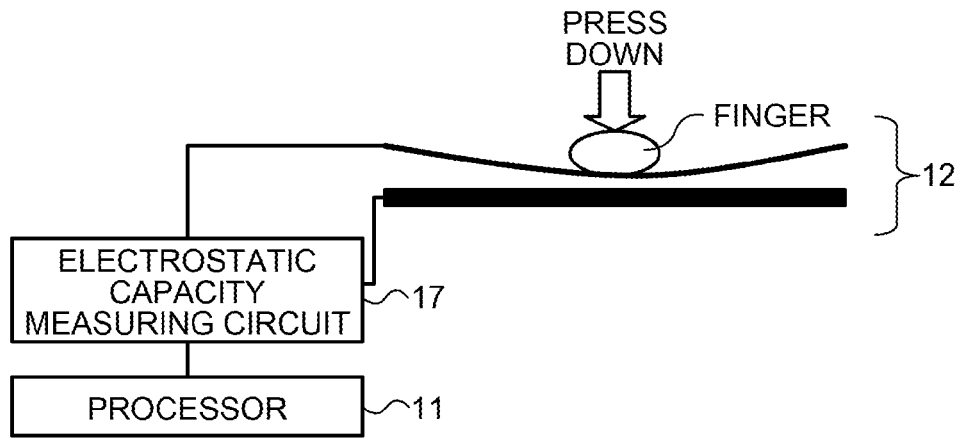
FIG. 9 is a view illustrating a configuration example of a touch panel of the first embodiment.
FIG. 10 is a view illustrating an example of a key display table of the first embodiment.

The second operation refers to the operation by which the touch panel 12 is pressed down for a press-down amount above a threshold. In order to enable the second operation, the touch panel 12 takes the configuration depicted in FIG. 9. FIG. 9 is a view illustrating a configuration example of the touch panel of the first embodiment. That is, an electrostatic capacity measuring circuit 17 connected to the touch panel 12 measures the electrostatic capacity at the touched position of the touch panel 12. The larger the press-down amount at the touched position is, the larger the electrostatic capacity will be. The processor 11 therefore determines that there is a decision operation of the entered character when the electrostatic capacity measured by the electrostatic capacity measuring circuit 17 is equal to or greater than the threshold.

Turning back to FIG. 3, at step S118, the processor 11 determines whether or not the timeout of the timer is detected. If the timeout of the timer is not detected (step S118: No), the process returns to step S108.

On the other hand, if the timeout of the timer is detected (step S118: Yes), the processor 11 outputs, from the speaker 16, the notification sound telling that the timeout has been detected (step S119).

Subsequently, the processor 11 fixes the current candidate for entering text as the entered character (step S120). That is, if the decision operation is made at step S117 (step S117: Yes) or if the timeout is detected at step S118 (step S118: Yes), the processor 11 fixes the entered character. That is, the touch entry to the touch panel 12 is fixed.

Subsequently, the processor 11 calculates the difference "dXdY" between the coordinate saved in the center coordinate buffer and the coordinate saved in the touched position buffer at the time when the touch entry to the touch panel 12 has been fixed (step S121).

Subsequently, the processor 11 determines whether or not it is possible to move the displayed position of the ten-key from the current position by the difference dXdY within the display module 14 (step S122).

If it is determined at step S122 that the movement is possible (step S122: Yes), the processor 11 reflects the difference dXdY to the whole XY coordinate of the key display table (step S123).

For example, it is assumed that the area size of the display module 14 is the one illustrated in FIG. 5 and the current state of the key display table is the one illustrated in FIG. 6. Further, the difference dXdY calculated at step S121 is assumed to be (dx, dY)=(+55, ±0). In this case, addition of dX "55" to the maximum value of X2 "460" in FIG. 6 results in X2+dX=515, which is included within the area size of the display module 14. Therefore, in this case, the processor 11 determines that the movement is possible at the step S122 and reflects (+55, ±0) to X1, X2, Y1, Y2 of FIG. 6 to update the key display table at step S123. Therefore, the updated key display table will be the one illustrated in FIG. 10. FIG. 10 is a view illustrating an example of the key display table of the first embodiment. In FIG. 10, the values of X1 and X2 are increased by 55 compared to in FIG. 6. Therefore, the display of the ten-key moves in the X direction by dx=55.

On the other hand, if it is not determined at step S122 that the movement is possible (step S122: No), the processor 11 voice notifies the user of the difference dXdY from the speaker 16 and does not reflect the difference dXdY to the XY coordinate of the key display table (step S124).

A series of operations at the time t1, t2, t3, and t5 illustrated in FIG. 2 will be described according to the process flows illustrated in FIG. 3 and FIG. 4.

Time t1

Before the time t1 in FIG. 2, the processor 11 causes the LCD 13 to display the ten-key (step S101) and waits for a touch on the touch panel 12 (step S102).

At the time t1, upon detecting the touch on the touched position T1 (step S102: Yes), the processor 11 starts the timer (step S103), determines that the key corresponding to the touched position T1 is the key k1 (step S104), and saves the determined result "key k1" in the entered key buffer (step S105). Further, the processor 11 copies the content "key k1" in the entered key buffer to the touched key buffer (step S106) and saves the center coordinate (240, 333) of the key k1 in the center coordinate buffer (step S107). The processor 11 then performs toggle character conversion (step S200). Since the key k1 is the key of the key type "ABC", in response to the touch at the time t1, "A" is displayed on the LCD 13 as the candidate for entering text.

It is noted that, if the touched position on the touch panel 12 is included in the area (200, 300)-(280, 365), the processor 11 determines that the key corresponding to the touched position is the key k1 based on the key display table of FIG. 6.

Time t2

At the time t2, upon detecting the touch at the touched position T2 (step S108: Yes), the processor 11 saves the coordinate of the touched position T2 in the touch position buffer (step S109). Further, the processor 11 determines that the key corresponding to the touched position T2 is the key k1 (step S110) and saves the determined result "key k1" in the entered key buffer (step S111).

The processor 11 then compares the content of the entered key buffer with the content of the touched key buffer (step S112). At the time t2, the content of the entered key buffer and the content of the touched key buffer are "key k1", and thus both match to each other (step S112: Yes). The processor 11 then resets and restarts the timer (step S116) and performs the toggle character conversion (step S200). Since the touch at the time t2 is the second touch successively made on the key k1, in response to the touch at the time t2, "B" is displayed on the LCD 13 as the candidate for entering text.

Then, at the time t2, it is assumed that no decision operation has been made (step S117: No). Further, it is assumed that the timeout of the timer has not been detected before the touch is made at the time t3 after the time t2 (step S118: No).

Time t3

At the time t3, upon detecting the touch on the touched position T3 (step S108: Yes), the processor 11 saves the coordinate at the touched position T3 in the touch position buffer (step S109). Further, the processor 11 determines that the key corresponding to the touched position T3 is the key k2 (step S110) and saves the determined result "key k2" in the entered key buffer (step S111).

The processor 11 then compares the content of the entered key buffer with the content of the touched key buffer (step S112). At the time t3, while the content of the entered key buffer is "key k2", the content of the touched key buffer is "key k1", and thus they do not match each other (step S112: No). The processor 11 then determines whether or not the timer restarted at the time t2 has expired, that is, whether or not the timer has timed out (step S113). That is, the processor 11 determines whether or not the elapsed time from the touch of the touch T2 at the time t2 to the touch of the touch T3 at the time t3 is equal to or greater than the threshold. It is assumed here that the timeout of the timer is not detected, that is, the elapsed time from the touch at the time t2 to the touch at the time t3 is less than the threshold (step S113: No). The processor 11 then changes the content of the entered key buffer from "key k2" to "key k1" by saving the content of the touched key buffer "key k1" in the entered key buffer (step S114). That is, the processor 11 decides that the touch on the key k2 at the time t3 is the touch on the key k1. The processor 11 then resets and restarts the timer (step S116) and performs the toggle character conversion (step S200). The processor 11 has decided that the touch on the key k2 at the time t3 is the touch on the key k1, so that the touch at the time t3 on the key k2 is the third touch successively made to the key k1. Therefore, in response to the touch at the time t3, "C" is displayed on the LCD 13 as the candidate for entering text.

It is noted that, when the touch area on the touch panel 12 is included in the area (290, 300)–(370, 365), the processor 11 determines that the key corresponding to the touched position is the key k2 based on the key display table of FIG. 6.

Then, at the time t3, it is assumed that no decision operation has been made (step S117: No). However, it is assumed that the time has elapsed after the time t3 without any touch made and the timeout of the timer restarted at the time t3 is detected at the time t5 (step S118: Yes).

Time t5

Because the processor 11 has detected the timeout of the timer at the time t5, that is, the elapsed time from the time t3 reaches the time equal to or greater than the threshold at the time t5 (step S118: Yes), the processor 11 outputs, from the speaker 16, the notification sound telling that the timeout has been detected (step S119) and fixes the current candidate for entering text "C" as the entered character (step S120). That is, the notification sound tells that the touch entry to the touch panel 12 has been fixed.

The processor 11 then calculates the difference dXdY between the center coordinate (240, 333) of the key k1 saved in the center coordinate buffer at the time t1 and the coordinate of the touched position T3 saved in the touched position buffer at the time t3 (step S121). It is assumed here that the calculated difference dXdY is (dX, dY)=(+55, ±0). Further, it is assumed that the area size of the display module 14 is the one illustrated in FIG. 5, and the states at the time t1, t2, and t3 of the key display table are the one illustrated in FIG. 6. In this case, as described above, the processor 11 determines that the displayed position of the ten-key can be moved by the difference dXdY within the area of the display module 14 (step S122: Yes). Then, the processor 11 reflects (+55, ±0) to X1, X2, Y1, and Y2 of FIG. 6 and updates the key display table (step S123), so that the updated key display table results in the one illustrated in FIG. 10. Therefore, the processor 11 causes the LCD 13 to display the ten-key based on the key display table of FIG. 10 at the time t5. Thus, the displayed position of the ten-key at the time t5 is the one moved by dX=55 in the X direction from the displayed position at the time t3. That is, the displayed position of the key k1 moves to the touched position T3.

As described above, the terminal 10 has the touch panel 12 that accepts the key k1 corresponding to the position (X1, Y1)–(X2, Y2)=(200, 300)–(280, 365) and the key k2 corresponding to the position (X1, Y1)–(X2, Y2)=(290, 300)–(370, 365). When detecting the touch on the key k1 and the touch on the key k2 and then detecting the touch on the key k2 after the detection of the touch on the key k1, the processor 11 determines the elapsed time from the touch on the key k1 to the touch on the key k2. When the elapsed time is less than the threshold, the processor 11 then decides that the touch on the key k2 is the touch on the key k1.

Doing so allows for deciding that the touches made within a predetermined time from the previous touch are the touches successively made to the same key. Therefore, when the user intends to successively touch the same key and even when every time the user touches, the touched position shifts and the different key from the desired key recognized by the user is touched, the user is able to make the key entry as the touch on the desired key. That is, a series of successive touches on the touch panel can match the successive entries to the same desired key recognized by the user. Therefore, the present embodiment can prevent the erroneous entry in the key entry using the touch panel. In particular, it can prevent the erroneous entry when the toggle entry is made by the user who is visually impaired or the user who makes the key entry without looking at the key image.

Further, the terminal 10 has the LCD 13 that displays the key k1 and the key k2. Upon deciding that the touch on the key k2 is the touch on the key k1, the processor 11 moves the displayed position of the key k1 in the LCD 13 to the touched position on the key k2.

Doing so allows the displayed position of the key k1 to shift by the amount of the shifting of the touched position, so that the user who can visually recognize the key to be touched is able to confirm that the touch on the key k2 decided that the touch is for the key k1 is the touch on the key k1. Therefore, it can improve the convenience at the user when deciding that the touch on the key k2 is the touch on the key k1.

Further, at the time when the elapsed time from the touch on the key k2 reaches the time equal to or greater than the threshold, the processor 11 outputs the notification sound telling that the touch entry has been fixed.

Doing so allows for notifying the user who is visually impaired, the user who makes the key entry without looking at the key image, or the like of the fixing of the touch entry that is automatically made by the terminal 10 based on the elapsed time.

[b] Other Embodiments

[1] Each process in the above description at the terminal 10 may also be implemented by causing the processor 11 to execute the pre-provided program. For example, the program corresponding to each process in the above description may be pre-stored in the memory 15 and each program may be read out from the memory 15 by the processor 11 to be executed.

[2] The disclosed technique is applicable not only for the terminal having a communication function as the smart phone but also for the terminal having no communication function.

According to the disclosed aspects, the erroneous entry in the key entry using the touch panel can be prevented.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A terminal device comprising:
   a touch panel that accepts a touch entry including a first touch on a first key and a second touch on a second key, the second touch being a next touch of the first touch, the first key corresponding to a first area, the second key corresponding to a second area that is different from the first area; and
   a processor configured to:
   detect the first touch and the second touch,
   determine whether the second touch is a touch to the first key or a touch to the second key based on elapsed time from the first touch to the second touch when the first touch is detected in the first area and the second touch is detected in the second area, and
   decide that the second touch is the touch to the first key regardless of the elapsed time from the first touch to the second touch when both the first touch and the second touch are detected in the first area.

2. The terminal device according to claim 1 further comprising a display that displays the first key and the second key, wherein, when deciding that the second touch is the touch to the first key, the processor moves a display position of the first key on the display to a touched position of the second touch.

3. The terminal device according to claim 1, wherein, at time when elapsed time from the second touch reaches equal to or greater than a threshold, the processor outputs a notification sound indicating that the touch entry has been fixed.

4. A key entry method in a terminal device comprising a touch panel that accepts a touch entry including a first touch on a first key and a second touch on a second key, the second touch being a next touch of the first touch, the first key corresponding to a first area, the second key corresponding to a second area that is different from the first area, the method comprising:
   detecting the first touch and the second touch;
   determining whether the second touch is a touch to the first key or a touch to the second key based on elapsed time from the first touch to the second touch when the first touch is detected in the first area and the second touch is detected in the second area; and
   deciding that the second touch is the touch to the first key regardless of the elapsed time from the first touch to the second touch when both the first touch and the second touch are detected in the first area.

5. A storage medium storing a key entry program used in a terminal device comprising a processor and a touch panel that accepts a touch entry including a first touch on a first key and a second touch on a second key, the second touch being a next touch of the first touch, the first key corresponding to a first area, the second key corresponding to a second area that is different from the first area, the key entry program causing the processor to execute a procedure, the procedure comprising:
   detecting the first touch and the second touch;
   determining whether the second touch is a touch to the first key or a touch to the second key based on elapsed time from the first touch to the second touch when the first touch is detected in the first area and the second touch is detected in the second area; and
   deciding that the second touch is the touch to the first key regardless of the elapsed time from the first touch to the second touch when both the first touch and the second touch are detected in the first area.

* * * * *